(12) United States Patent
Johnston et al.

(10) Patent No.: US 8,926,131 B2
(45) Date of Patent: *Jan. 6, 2015

(54) SOLID STATE LIGHT WITH ALIGNED LIGHT GUIDE AND INTEGRATED VENTED THERMAL GUIDE

(75) Inventors: Raymond P. Johnston, Lake Elmo, MN (US); Robert L. Brott, Woodbury, MN (US); Paul E. Humpal, Stillwater, MN (US); Kayla A. Hagens, Cottage Grove, MN (US); Charles N. DeVore, Hugo, MN (US); Karl J. L. Geisler, Saint Paul, MN (US); Hamid R. Mortazavi, Woodbury, MN (US); Wesley A. Raider, Hudson, WI (US); Gary W. Schukar, North Oaks, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 374 days.

This patent is subject to a terminal disclaimer.

(21) Appl. No.: 13/466,330

(22) Filed: May 8, 2012

(65) Prior Publication Data
US 2013/0301268 A1 Nov. 14, 2013

(51) Int. Cl.
*F21V 29/00* (2006.01)
(52) U.S. Cl.
USPC ...... 362/249.02; 362/612; 362/615; 362/294; 362/373; 362/296.01; 362/341
(58) Field of Classification Search
None
See application file for complete search history.

(56) References Cited

U.S. PATENT DOCUMENTS

| | | | |
|---|---|---|---|
| 7,160,012 B2 | 1/2007 | Hilscher et al. | |
| 7,347,584 B2 | 3/2008 | Sun et al. | |
| 7,513,653 B1 | 4/2009 | Liu et al. | |
| D642,704 S * | 8/2011 | Hagens et al. | D26/2 |
| 8,487,518 B2* | 7/2013 | Johnston et al. | 313/46 |
| 8,761,565 B1* | 6/2014 | Coleman et al. | 385/146 |
| 2005/0105302 A1 | 5/2005 | Hofmann et al. | |
| 2005/0200262 A1 | 9/2005 | Wu | |
| 2007/0070645 A1 | 3/2007 | Coushaine et al. | |
| 2008/0049399 A1 | 2/2008 | Lu et al. | |
| 2009/0034283 A1 | 2/2009 | Albright et al. | |

(Continued)

FOREIGN PATENT DOCUMENTS

| | | |
|---|---|---|
| KR | 2010-0105289 | 9/2010 |
| KR | 2011-0101789 | 9/2011 |
| WO | WO 2010/058325 | 5/2010 |
| WO | WO 2010/146746 | 12/2010 |

OTHER PUBLICATIONS

DeVore et al., "Electrical Connectors for a Solid State Light" U.S. Appl. No. 13/435,224, filed Mar. 30, 2012.

*Primary Examiner* — Ashok Patel (57) ABSTRACT

A light with integrated light and thermal guides, and having solid state light sources such as LEDs. The light guide includes a material having a first surface and a second surface opposite the first surface and forming an interior volume. The light guide is coupled to the LEDs for receiving and distributing light from them through the first surface, and the light is transported through the light guide until the light is extracted from the first or second surface. The light guide can include alignment features such as fiducials that mate with a base. The thermal guide is contained within the interior volume and integrated with the light guide for providing thermal conduction from the LEDs for cooling the light. The thermal guide can be vented to provide for internal cross flow of air for the cooling.

11 Claims, 7 Drawing Sheets

(56) References Cited

U.S. PATENT DOCUMENTS

| | | |
|---|---|---|
| 2010/0181888 A1 | 7/2010 | Lu |
| 2010/0246166 A1 | 9/2010 | Hsu et al. |
| 2011/0032708 A1 | 2/2011 | Johnston et al. |
| 2011/0037368 A1 | 2/2011 | Huang |
| 2011/0181183 A1 | 7/2011 | Yoo |
| 2011/0309735 A1 | 12/2011 | Parker et al. |
| 2012/0051058 A1 | 3/2012 | Sharma et al. |
| 2012/0135133 A1* | 5/2012 | O'Neill et al. .............. 427/2.27 |
| 2012/0139403 A1 | 6/2012 | Johnston et al. |
| 2012/0194054 A1* | 8/2012 | Johnston et al. ............... 313/46 |
| 2013/0257278 A1* | 10/2013 | DeVore et al. ............... 315/113 |

* cited by examiner

SOLID STATE LIGHT WITH ALIGNED LIGHT GUIDE AND INTEGRATED VENTED THERMAL GUIDE

BACKGROUND

The energy efficiency of lighting has become an important consideration in industrial, consumer, and architectural lighting applications. With the advances in solid state light technology, light emitting diodes (LEDs) have become more energy efficient than fluorescent lights. Further, the marketplace has a large established fixture base for Edison, fluorescent and high intensity discharge lights. These types of applications present a significant technical challenge for LEDs due to their inherent point source nature, and the need to operate the LEDs at relatively low temperatures. Today there are many solutions addressing these issues, including fans, thermal sinks, heat pipes and the like. However, these approaches limit the applications by adding complexity, cost, efficiency loss, added failure modes, and an undesirable form factor. The need remains to find a solution that can provide optical and electrical efficiency benefits, at attractive manufacturing costs and design.

SUMMARY

A light with integrated light and thermal guides, consistent with the present invention, includes at least one solid state light source, a light guide, and a thermal guide. The light guide includes a material having a first surface and a second surface opposite the first surface and forming an interior volume. The light guide is coupled to the solid state light source for receiving and distributing light from the solid state light source through the first surface, and the light is transported through the light guide until the light is extracted from the first or second surface. The thermal guide is at least partially contained within the interior volume and integrated with the light guide for providing thermal conduction from the solid state light source for cooling the light.

The light guide can include one or more of the following features: alignment features such as fiducials that mate with a base; spacers extending along a portion of at least one of the light guide surfaces; and multiple portions mated together with interlocking features.

The thermal guide can include one or more of the following features: apertures to provide for internal cross flow of air; and an internal core with an asymmetric shape to provide for air flow across the core.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Solid State Light

Figure 1:
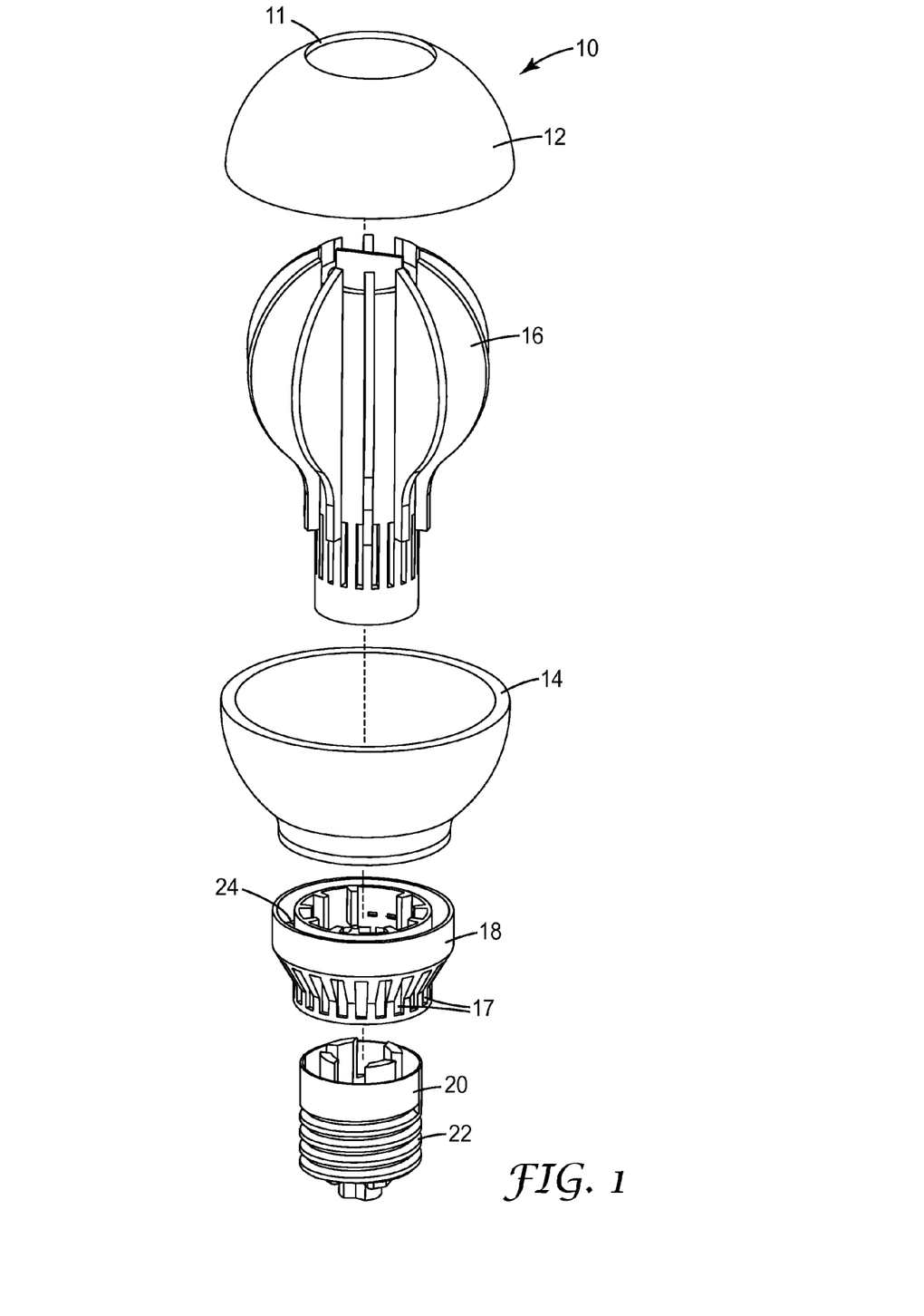
FIG. 1 is an exploded perspective view of an LED light with a light guide and thermal guide.
Figure 2:
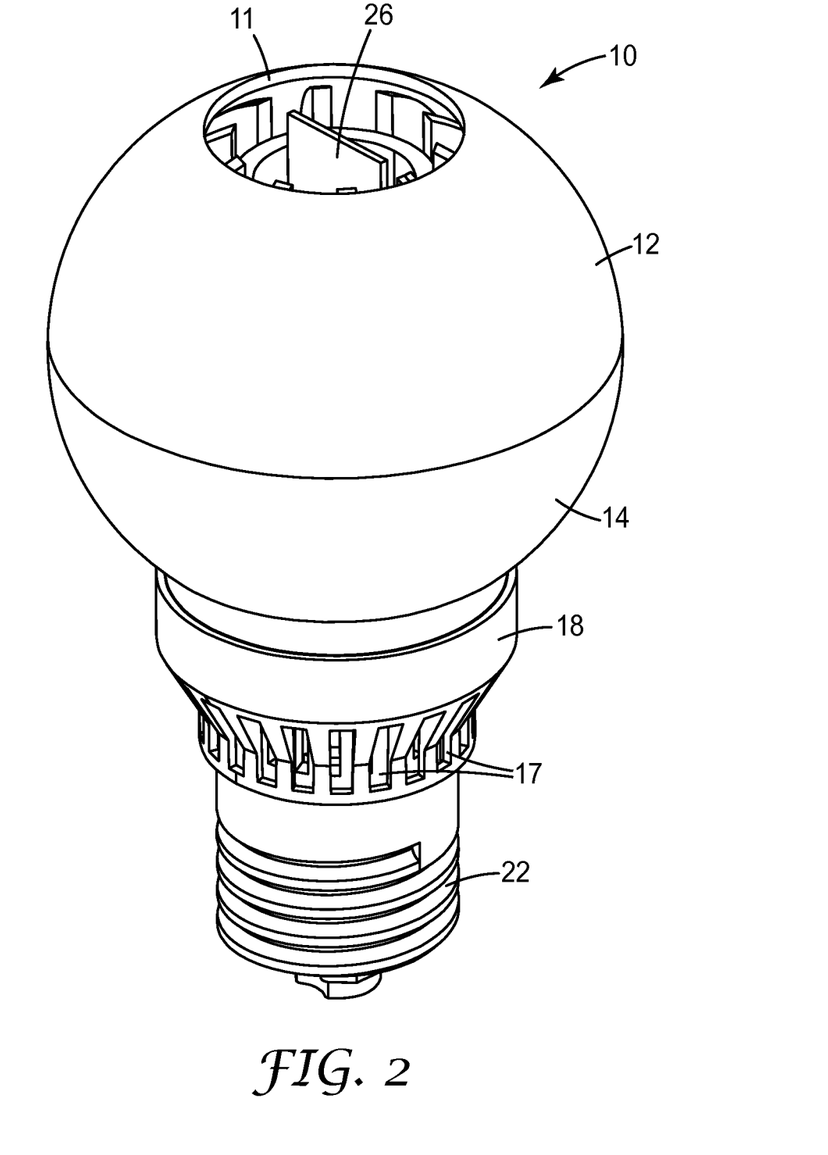
FIG. 2 is a perspective view of the light of FIG. 1 as assembled.

FIG. 1 is an exploded perspective view of a solid state light 10. FIG. 2 is a perspective view of light 10 as assembled. The perspective view in FIG. 2 is looking at the side and top of light 10, which is generally symmetrical from a side view. Light 10 includes a light guide comprised of upper and lower portions 12 and 14, an integrated thermal guide 16, a decorative light ring section 18 containing a light circuit 24 having solid state light sources such as LEDs, a base portion 20, and a base 22 for electrical connection to a power source such as via conventional light sockets. Base 22 can be implemented with an Edison base to be secured within a corresponding light socket, and base portion 20 can be implemented with an insulator in contact with base 22. Although the light guide is shown as having two portions, it can alternatively have more than two portions or be composed of a single continuous piece of material. Also, the light guide can be configured to form an interior volume, such as by having a bulb shape as shown.

As illustrated in FIG. 2, upper portion 12 mates with lower portion 14 to form the light guide, and lower portion 14 mounts to light ring 18 in order to optically couple with solid state light sources on light circuit 24. Thermal guide 16 connects with light ring 18 and base portion 20 in order to draw and dissipate heat from the solid state light sources. As shown in FIG. 1, thermal guide 16 has a central core connected with external metal fins, which can conform to the shape of the light guide and be located at least partially within the interior volume formed by the light guide. As shown in FIGS. 1 and 2, an air passage 11 in upper portion 12 along with apertures 17 in light ring 18 allow air flow across thermal guide 16.

A driver circuit 26, on a printed circuit board or flexible circuit, is mounted in the central core of thermal guide 16 such as within a slot in the thermal guide. When mounted, driver circuit 26 is electrically connected with solid state light sources on light circuit 24 and base 22. Driver circuit 26 receives power from a power supply, typically a high voltage AC power source, via base 22 and provides the required voltages and currents to drive the solid state light sources. Driver circuit 26 can be thermally coupled to the thermal guide in order to help cool the electronic components.

Examples of solid state lights, including lights using LEDs, are described in the following, all of which are incorporated herein by reference as if fully set forth: U.S. Patent Application Publication No. 2011/0032708; U.S. patent application Ser. No. 12/960,642, entitled "Solid State Light with Optical Guide and Integrated Thermal Guide," and filed Dec. 6, 2010; and U.S. patent application Ser. No. 13/435,224, entitled "Electrical Connectors for Solid State Light," and filed Mar. 30, 2012.

Aligned Light Guide and Vented Thermal Guide

Figure 3:
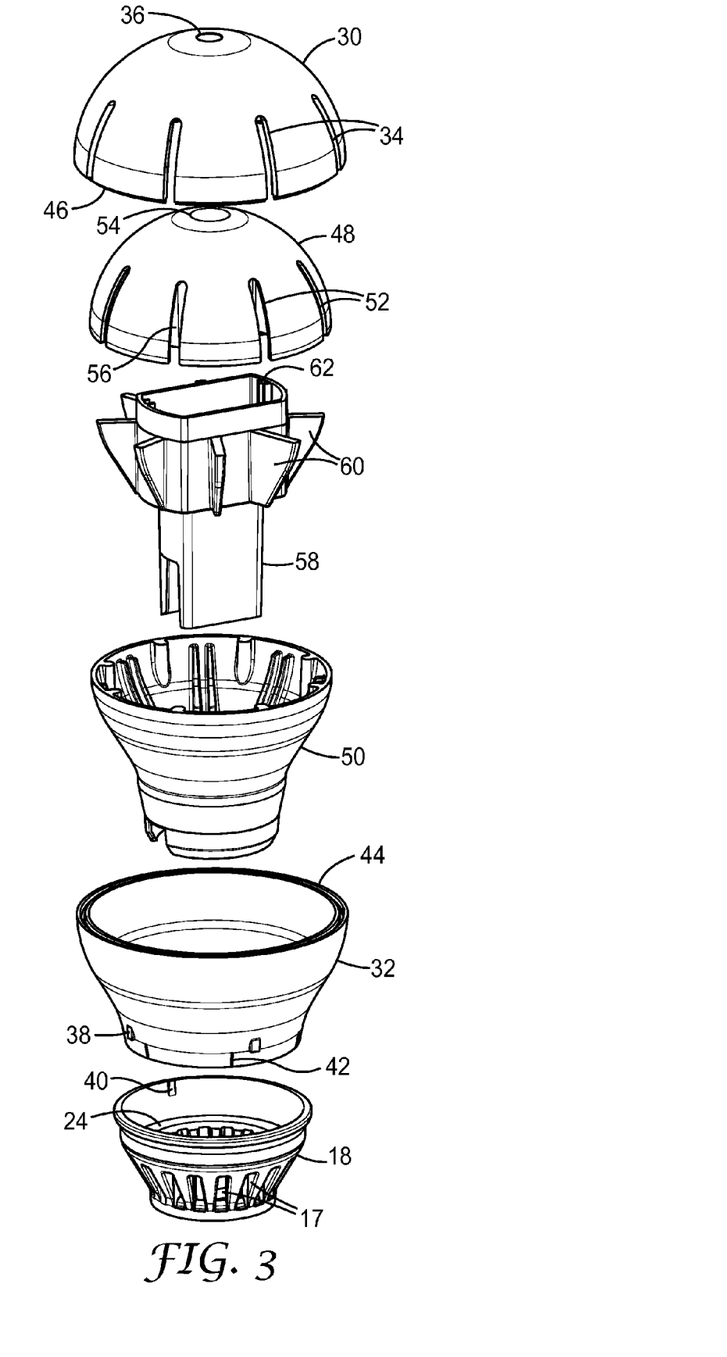
FIG. 3 is an exploded perspective view of an aligned light guide with an integrated vented thermal guide.
Figure 4:
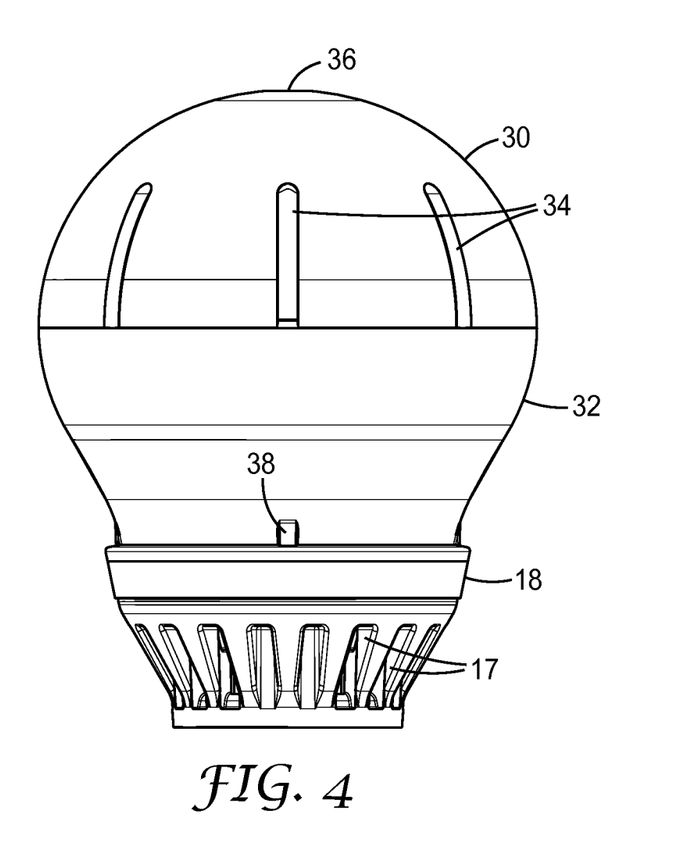
FIG. 4 is a side view of the light guide and thermal guide of FIG. 3 as assembled.
Figure 5:
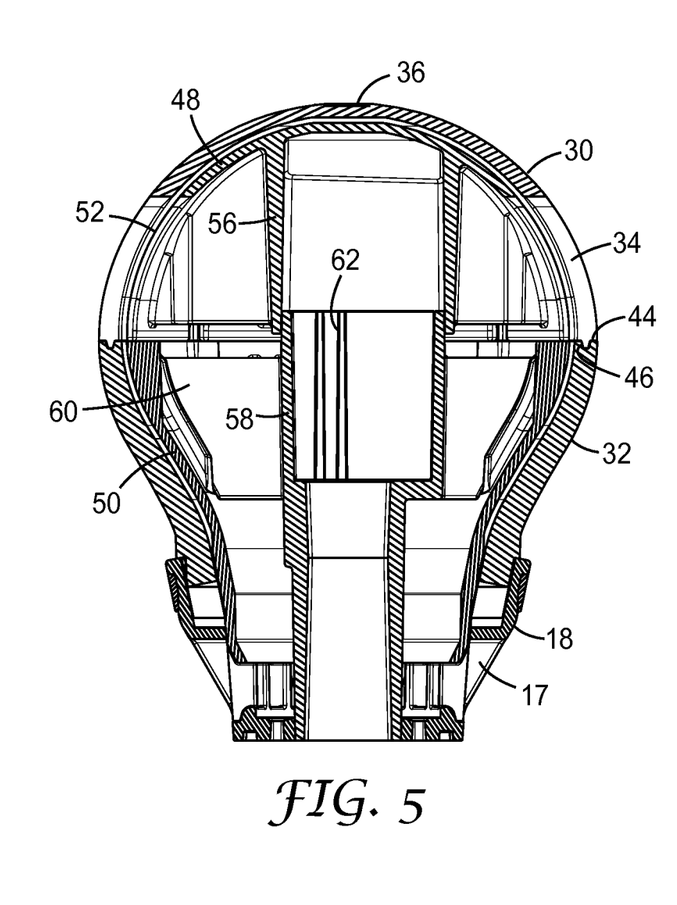
FIG. 5 is a side sectional view of the light guide and thermal guide of FIG. 3 as assembled.
Figure 6:
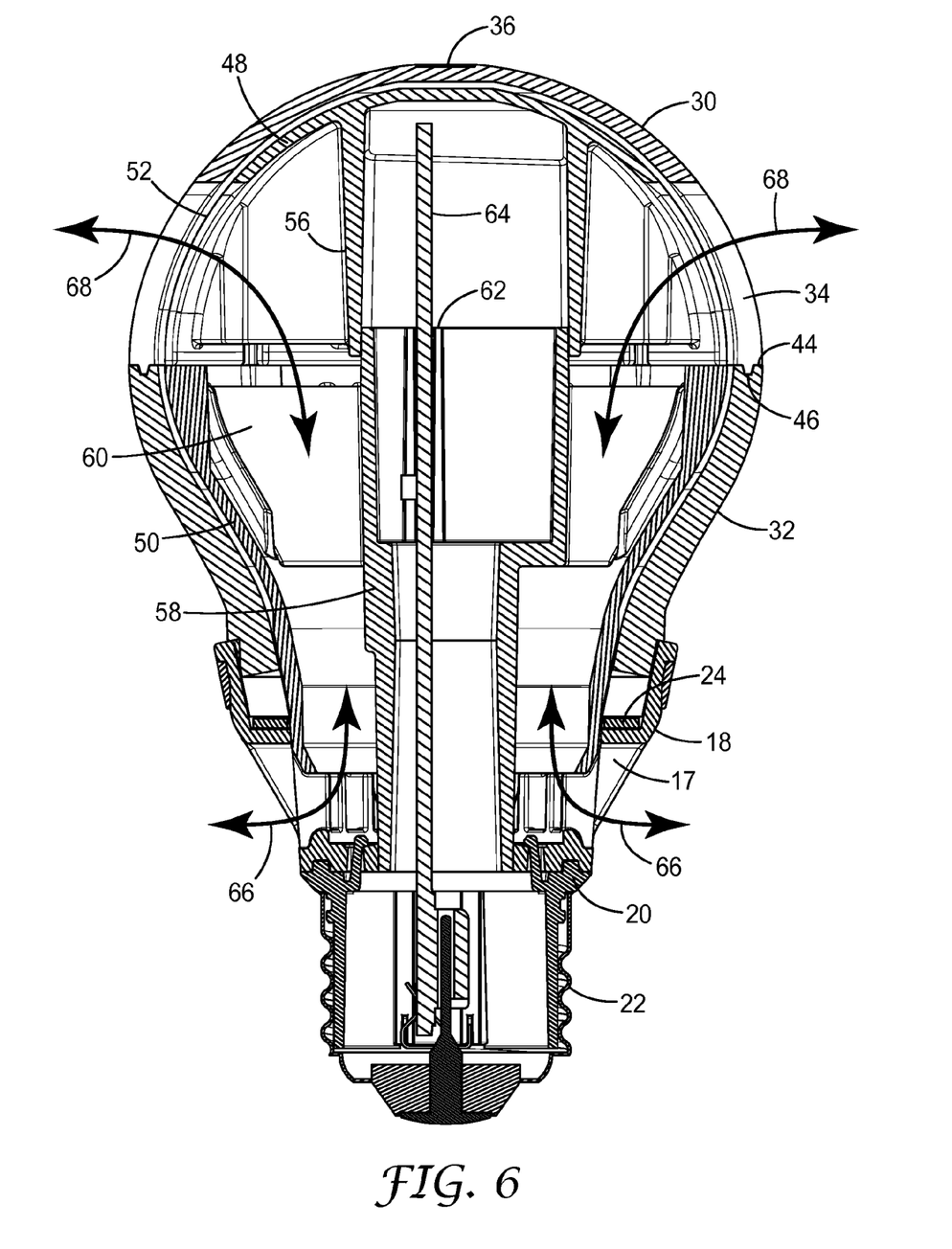
FIG. 6 is another side sectional view of the light guide and thermal guide of FIG. 3 as assembled and illustrating asymmetric internal cross flow or air across the thermal guide.
Figure 7:
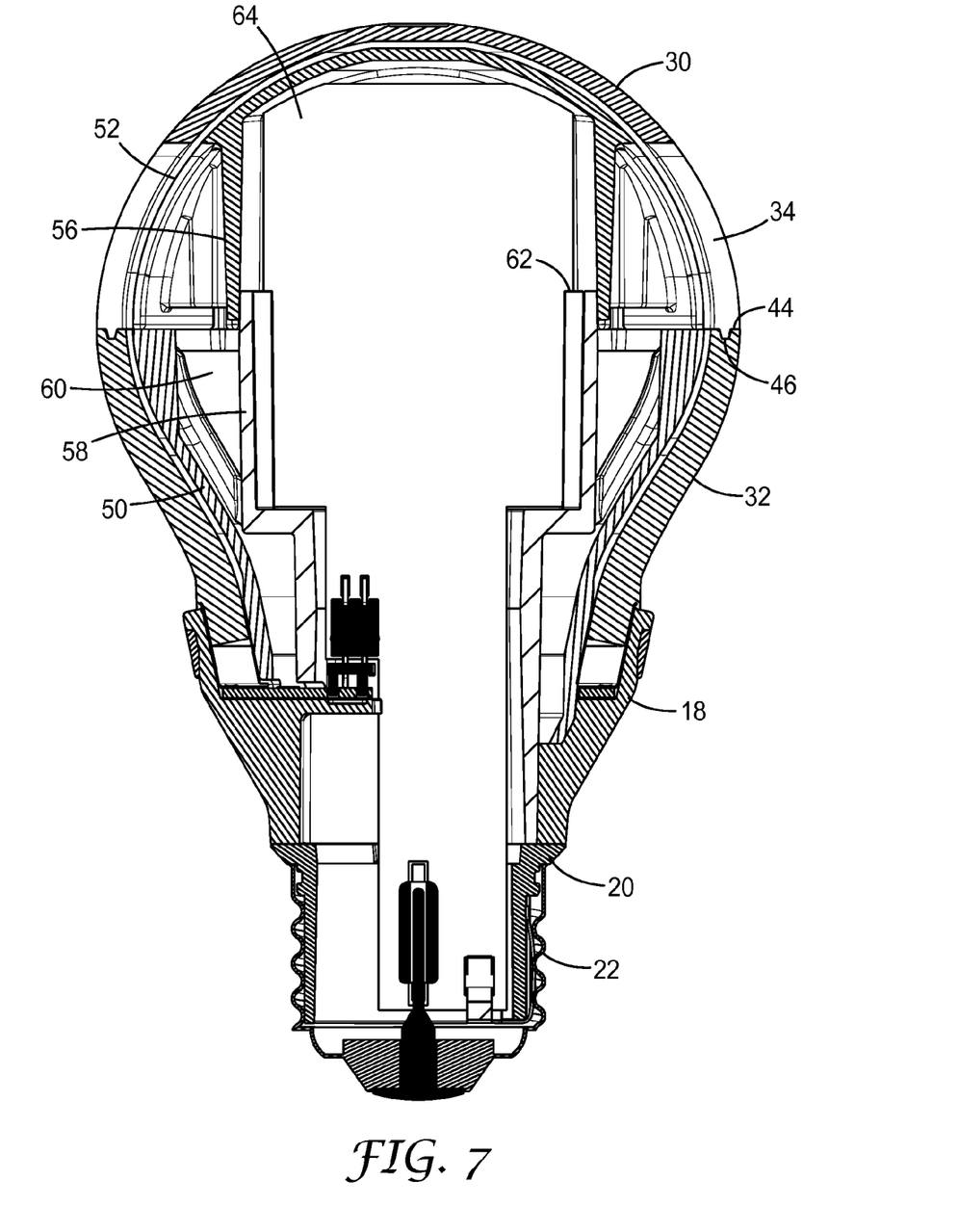
FIG. 7 is another side sectional view of the light guide and thermal guide of FIG. 3 as assembled and rotated ninety degrees from the view of FIG. 6.

In an alternative embodiment, FIGS. 3-7 illustrate preferred light guide and thermal guide constructions for the solid state light. In particular, FIG. 3 is an exploded perspective view of an aligned light guide with an integrated vented thermal guide. FIGS. 4 and 5 are side and side sectional views, respectively, of the light guide and thermal guide of FIG. 3 as assembled. FIGS. 6 and 7 are other side sectional views, rotated ninety degrees from one another, of the light guide and thermal guide of FIG. 3, illustrating asymmetric internal cross flow of air across the thermal guide.

In this alternative embodiment, the light guide includes a top portion 30 and bottom portion 32. Top portion 32 includes side apertures 34 and a region 36 next to an injection molding gate when top portion 32 is molded. When installed, bottom portion 32 includes a bottom edge coupled to the solid state light sources in light circuit 24 for receiving and distributing light from the solid state light sources through a surface of the top and bottom portions. When installed, the bottom edge of bottom portion 32 fits within light ring 18.

An edge 46 of top portion 30 mates with an edge 44 of bottom portion 32 through interlocking mating features. In particular, edge 46 includes a v-shaped protrusion that mates with a v-shaped groove on edge 44 (see FIGS. 5-7). The interlocking mating features provides for alignment of top portion 30 with bottom portion 32 such that their exterior surfaces are at least substantially in alignment. Although a v-shaped groove and protrusion are shown, the interlocking mating features can have other shapes that provide for alignment of the light guide portions. With top and bottom portions 30 and 32 mated together, they can be secured with an adhesive between edges 44 and 46 such as an optically clear adhesive.

Bottom portion 32 of the light guide also includes features for aligning it with light ring 18. In particular, bottom portion 32 includes a plurality of fiducials 38 that align to light ring 24. The light guide 32 aligns to the top 24 and slots 40 on light ring 18 (see FIGS. 3 and 4). In addition to alignment, the mating of fiducials 38 with slots 40 can prevent unwanted twisting or rotation of bottom portion 32 in light ring 18. Fiducials 38 can be implemented with any shape of protrusion that mates with recesses in light ring 18. Alternatively, fiducials 38 can be implemented with any shape of recess that mates with protrusions in light ring 18.

Bottom portion 32 also includes a plurality of spacers (ridges) 42 extending along a portion of the interior or exterior surfaces of it. Spacers 42 preferably extend from an edge of bottom portion 32 along a part of the exterior surface of it (see FIG. 3). When bottom portion 32 is aligned within light ring 18, spacers create a gap between bottom portion 32 and light ring 18. Spacers 42 can also be present on the interior surface of bottom portion 32 creating a gap between bottom portion 32 and thermal guide 50. When the recess is lined with a reflective film, spacers 42 can help prevent wet-out of the film. An example of such as reflective film is the Enhanced Specular Reflector film product from 3M Company.

In this alternative embodiment, the thermal guide includes a top shell 48 with an inner top core 56 and a bottom shell 50 with an inner bottom core 58. Top shell 48 fits within and conforms to a shape of top portion 30 of the light guide. Top shell 48 includes side apertures 52 aligned with apertures 34 and optionally a top aperture 54 aligned with region 36. The alignment of the thermal guide apertures with the light guide apertures provides for air flow through the light for cooling of it.

Bottom core 58 includes fins 60 that mate with slots on the inside of bottom shell 50. An inner slot 62 in bottom core 58 is used for holding and aligning a driver circuit board 64 (see FIGS. 6 and 7). The base of bottom core 58 can be press fit to light ring 18 (see FIG. 6). Base portion 20 can be implemented with plastic and forms an insulator inside base 22. Base portion 20 can be snap fit to light ring 18 (see FIG. 6). Bottom core 58 can include a potting compound providing for thermal conduction from the driver circuit board. The exterior surfaces of top shell 48 and bottom shell 50 can be powder coated with a high gloss super white coating to provide a reflective surface behind the inner surface of the light guide. The components of this thermal guide can be implemented with a metallic material, for example aluminum.

Bottom core 58 has an asymmetric shape to accommodate a shape of the driver circuit board and provide for asymmetric air flow across the core. FIG. 6 illustrates air flow as represented by arrows 66 and 68. As represented by arrow 68, air flow is provided through apertures 34 and 52, between fins 60, and along a side of bottom core 58. As represented by arrow 66, air flow is provided through apertures 17, between fins 60 through the bottom of bottom shell 50, and along a side of bottom core 58. The air flow occurs across the sides of the bottom core 58 with one of the sides being shown in FIG. 7, which also illustrates how the shape of driver circuit board 64 conforms to a shape of bottom core 58. The use of an asymmetrically shaped thermal guide core to house the driver circuit board provides for air flow through the light and across the thermal guide core whether the light is mounted vertically or horizontally, or at an angle between those two positions. Air can also flow from aperture 34 to an opposite aperture 34 when the light is mounted vertically.

Figure 8A:
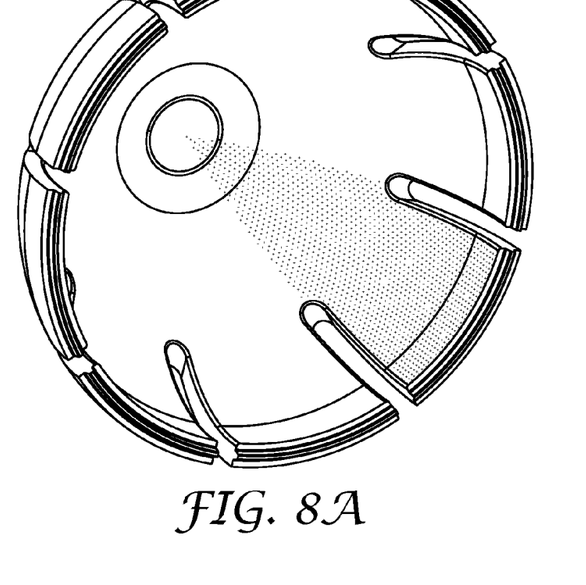
FIGS. 8A and 8B are diagrams of a light extraction pattern for the inside of the top and bottom portions, respectively of the light guide.
Figure 8B:
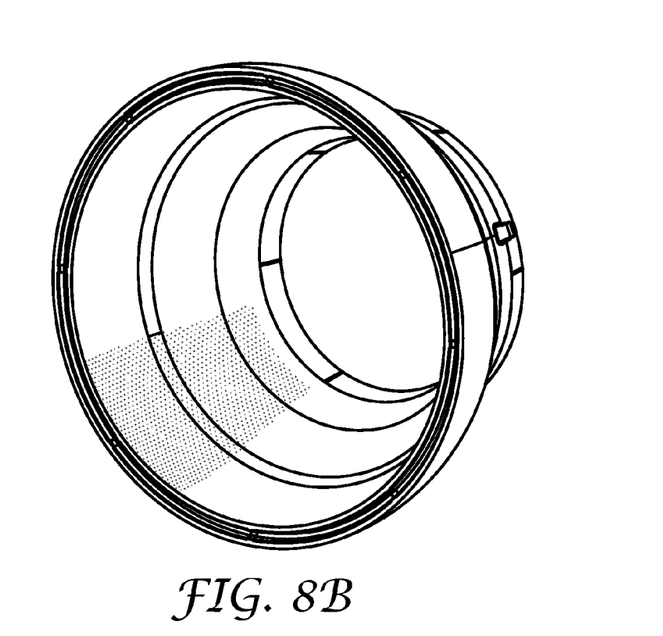

FIGS. 8A and 8B are diagrams of a segment of a light extraction pattern for the inside of the top and bottom portions, respectively of the light guide. This segment of the light extraction pattern can be duplicated around the inside surface of the light guide. This extraction pattern can be milled into a light guide mold using a three-axis mill, which results in the pattern being a distribution of shapes from a nearly spherical shape progressively changing to a teardrop shape. This pattern helps prevent interferences when the light guide is made through a molding process. The light guide is preferably composed of acrylic with this light extraction pattern formed on its interior surface. This light extraction pattern can facilitate a desired light distribution.

In the above description, the labels "top" and "bottom" for the light guide and thermal guide components are used for reference purposes only, since the light can be installed in different positions.

The invention claimed is:

1. A light, comprising:
    at least one solid state light source;
    a light guide comprising a material having a first surface and a second surface opposite the first surface,
    wherein the second surface forms an interior volume, the light guide has a bottom edge coupled to the solid state light source for receiving and distributing light from the solid state light source through the first surface, and the light is transported through the light guide until the light is extracted from the first or second surface of the light guide,
    wherein the light guide includes a plurality of spacers extending along a portion of at least one of the first or second surfaces; and
    a section containing the solid state light source and coupled to the light guide, wherein the spacers are located on the first surface of the light guide adjacent the section, and the spacers create a gap between the light guide and the section.

2. The light of claim 1, further comprising a thermal guide at least partially contained within the interior volume and integrated with the light guide for providing thermal conduction from the solid state light source for cooling the light.

3. The light of claim 1, wherein the light guide is composed of acrylic.

4. The light of claim 1, further comprising extraction features on the second surface of the light guide.

5. The light of claim 1, wherein the light guide has a top portion and a bottom portion mated together with interlocking features.

6. A light, comprising:
   at least one solid state light source;
   a light guide comprising a material having a first surface and a second surface opposite the first surface,
   wherein the second surface forms an interior volume, the light guide has a bottom edge coupled to the solid state light source for receiving and distributing light from the solid state light source through the first surface, and the light is transported through the light guide until the light is extracted from the first or second surface of the light guide,
   wherein the light guide includes a plurality of spacers extending along a portion of at least one of the first or second surfaces;
   a base for connection to a power supply; and
   a section having a first side coupled to the base and having a second side opposite the first side and coupled to the light guide,
   wherein the light guide has a plurality of fiducials, proximate the bottom edge, that mate with the section.

7. A light with integrated light and thermal guides, comprising:
   at least one solid state light source;
   a light guide comprising a material having a first surface and a second surface opposite the first surface,
   wherein the second surface forms an interior volume, the light guide has a bottom edge coupled to the solid state light source for receiving and distributing light from the solid state light source through the first surface, and the light is transported through the light guide until the light is extracted from the first or second surface of the light guide,
   wherein the light guide includes a plurality of spacers extending along a portion of at least one of the first or second surfaces;
   a thermal guide at least partially contained within the interior volume and integrated with the light guide for providing thermal conduction from the solid state light source for cooling the light,
   wherein the thermal guide has an exterior shell with a plurality of apertures providing for air flow through the shell; and
   a reflective coating on an exterior surface of the exterior shell.

8. A light with integrated light and thermal guides, comprising:
   at least one solid state light source;
   a light guide comprising a material having a first surface and a second surface opposite the first surface,
   wherein the second surface forms an interior volume, the light guide has a bottom edge coupled to the solid state light source for receiving and distributing light from the solid state light source through the first surface, and the light is transported through the light guide until the light is extracted from the first or second surface of the light guide,
   wherein the light guide includes a plurality of spacers extending along a portion of at least one of the first or second surfaces; and
   a thermal guide at least partially contained within the interior volume and integrated with the light guide for providing thermal conduction from the solid state light source for cooling the light,
   wherein the thermal guide has a internal core with an asymmetric shape providing for air flow across the core.

9. The light of claim 8, further comprising a driver circuit for providing power to drive the solid state light source, wherein a shape of the driver circuit conforms to a shape of the internal core.

10. The light of claim 8, further comprising fins on an exterior surface of the internal core.

11. The light of claim 8, wherein the thermal guide has an exterior shell with a plurality of apertures providing for air flow through the shell.

* * * * *